US006999494B2

(12) United States Patent
Bhandarkar

(10) Patent No.: US 6,999,494 B2
(45) Date of Patent: Feb. 14, 2006

(54) PACKAGING AND PASSIVE ALIGNMENT OF MICROLENS AND MOLDED RECEPTACLE

(75) Inventor: Sarvotham M. Bhandarkar, Plano, TX (US)

(73) Assignee: Photodigm, Inc., Richardson, TX (US)

( * ) Notice: Subject to any disclaimer, the term of this patent is extended or adjusted under 35 U.S.C. 154(b) by 107 days.

(21) Appl. No.: 10/464,121

(22) Filed: Jun. 18, 2003

(65) Prior Publication Data

US 2004/0258110 A1   Dec. 23, 2004

(51) Int. Cl.
G02B 6/30 (2006.01)
G02B 6/28 (2006.01)
(52) U.S. Cl. ............................ 372/107; 385/31; 385/49
(58) Field of Classification Search ................. 372/107
See application file for complete search history.

(56) References Cited

U.S. PATENT DOCUMENTS 5,024,966 A * 6/1991 Dietrich et al. ............... 438/23
5,349,590 A * 9/1994 Amirkhanian et al. ......... 372/6
6,452,726 B1 * 9/2002 Mandella ..................... 359/641
6,741,777 B1 * 5/2004 Jewell et al. .................. 385/49
6,801,693 B1 * 10/2004 Jacobowitz et al. .......... 385/50

\* cited by examiner

Primary Examiner—James Vannucci
(74) Attorney, Agent, or Firm—Duke W. Yee; Brian D. Owens; Stephen R. Tkacs

(57) ABSTRACT

A planar wafer-level packaging method is provided for a laser and a microlens. Light from the laser is directed and shaped by the microlens to couple into an external light guide. A plurality of such assemblies, each comprising a laser and a microlens may be assembled on a single planar substrate. A tapered surface is formed on the microlens. The microlens may be formed from a silicon substrate. The angle of the tapered surface causes an accurate cone or pyramid shape. The tapered surface is formed such that the axis of the cone or pyramid is aligned with the optical axis of the lens. The lens may then be aligned with the optical axis of the laser. A light guide receptacle is formed with a tapered surface that matches the tapered surface of the microlens. The tapered surface of the receptacle is formed such that the axis of the cone or pyramid is aligned with the optical axis of the receptacle. The receptacle may then be passively aligned with the microlens by mating the tapered surfaces.

20 Claims, 5 Drawing Sheets

PACKAGING AND PASSIVE ALIGNMENT OF MICROLENS AND MOLDED RECEPTACLE

CROSS REFERENCE TO RELATED APPLICATIONS

The present invention is related to U.S. patent application entitled "Planar and Wafer Level Packaging of Semiconductor Lasers and Photo Detectors for Transmitter Optical Sub-Assemblies," Ser. No. 10/283,730, filed Oct. 30, 2002, assigned to the same assignee, and incorporated herein by reference.

BACKGROUND OF THE INVENTION

1. Technical Field

The present invention relates to lasers and, in particular, to packaging for laser assemblies. Still more particularly, the present invention provides a method and apparatus for packaging a laser with a microlens and passive alignment with a molded receptacle.

2. Description of the Related Art

Fiber optics are used for short distance communications. A laser (Light Amplification by the Stimulated Emission of Radiation) is a device that creates a uniform and coherent light that is very different from an ordinary light bulb. Many lasers deliver light in an almost-perfectly parallel beam (collimated) that is very pure, approaching a single wavelength. Lasers create ultra-high-speed, miniscule pulses traveling in optical fibers. Light traveling in an optical fiber is impervious to external interference, which is a problem with electrical pulses in copper wire.

An optical fiber is a thin glass strand designed for light transmission. A single hair-thin fiber is capable of transmitting trillions of bits per second. There are two primary types of fiber. Multimode fiber is very common for short distances and has a core diameter of from 50 to 100 microns. For intercity cabling and highest speed, singlemode fiber with a core diameter of less than 10 microns is used.

A laser assembly which includes a lens and a receptacle to hold the fiber presents problems in packaging and alignment, especially for single mode fibers. The optical axes of the laser, the lens, and the receptacle must be aligned precisely to within a couple of microns for maximum coupling of light into the single mode fiber. Active alignment techniques are typically used for this, wherein the fiber is aligned while actively monitoring the amount of light coupled into fiber. Using special algorithms and precision sub-micron stages, the fiber is moved to the optimum position and then permanently fixed in place by laser welding. Post-weld shift correction is sometimes necessitated to complete the assembly. Cycle time for this entire process may be in the order of several minutes, which is very time consuming. Coupled with the high cost of the alignment and laser weld equipment, active alignment is one of the largest contributors to the overall cost of the package.

Therefore, it would be advantageous to provide a method and apparatus for allowing passive alignment of the light source to a fiber receptacle and which is also amenable to assembly using standard automated pick-and-place equipment.

SUMMARY OF THE INVENTION

The present invention provides a planar wafer-level packaging method for a laser and a microlens. Light from the laser is directed and shaped by the microlens to couple into an external light guide. A plurality of such assemblies, each comprising a laser and a microlens may be assembled on a single planar substrate. A tapered surface is formed on the microlens. The microlens may be formed from a silicon substrate. The crystalline structure of the silicon causes the tapered surface to be formed accurately along the <111> plane. The angle of the tapered surface causes an accurate cone or pyramid shape. The tapered surface is formed such that the axis of the cone or pyramid is aligned with the optical axis of the lens. The lens may then be aligned with the optical axis of the laser. A light guide receptacle is formed with a tapered surface that matches the tapered surface of the microlens. The tapered surface of the receptacle is formed such that the axis of the cone or pyramid is aligned with the optical axis of the receptacle. The receptacle may then be passively aligned with the microlens by mating the tapered surfaces.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention to enable others of ordinary skill in the art to understand the invention for various embodiments with various modifications as are suited to the particular use contemplated.

Figure 1:
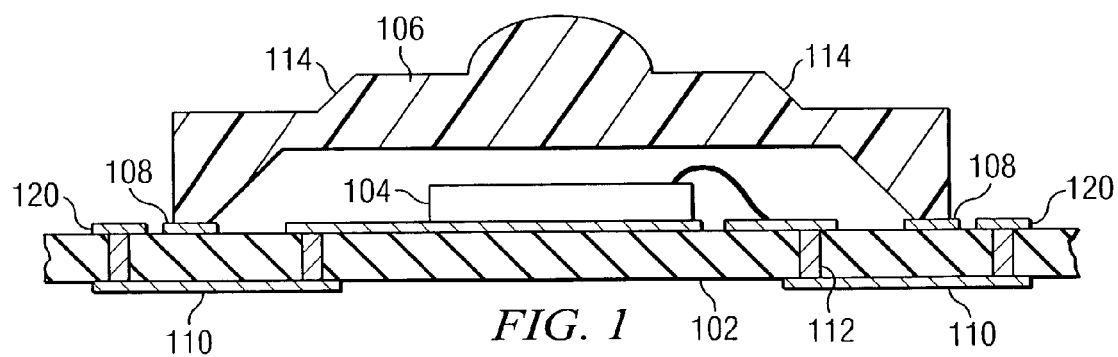
FIG. 1 is a diagram depicting an example laser assembly in accordance with a preferred embodiment of the present invention.

With reference now to the figures and in particular with reference to FIG. 1, a diagram depicting an example laser assembly is shown in accordance with a preferred embodiment of the present invention. The laser assembly may be a planar assembly with laser 104 affixed to substrate 102. Laser 104 may be a grating-outcoupled surface emitting (GSE) laser. Further details for the GSE laser may be found in copending patent application Ser. No. 09/844,484 to Evans et al., entitled "Grating Outcoupled Surface Emitting Lasers," filed on Apr. 27, 2001, and herein incorporated by reference.

Microlens 106 is affixed to substrate 102 to form a hermetically sealed cavity over the laser. The microlens may be affixed to the substrate using a eutectic attach 108. A conductor pattern 110 is formed on the underneath side of the substrate for printed circuit board (PCB) mounting. Laser 104 and bus lines 120 are connected to the conductor pattern through via 112. The microlens has a lens formed therein. The lens must be aligned with the optical axis of the laser.

In accordance with a preferred embodiment of the present invention, microlens 106 has formed therein a tapered surface 114. The tapered surface surrounds the lens to form a cone or pyramid shape. The microlens may be formed from a silicon substrate. The crystalline structure of the silicon causes the tapered surface to be formed accurately along the <111> plane. The angle of the tapered surface causes an accurate cone or pyramid shape. The tapered surface 114 is formed such that the axis of the cone or pyramid is coincident with the optical axis of the lens. In a silicon substrate this can be achieved to a high degree of accuracy by defining the microlens and tapered surface using the same photolithographic mask.

Figure 2:
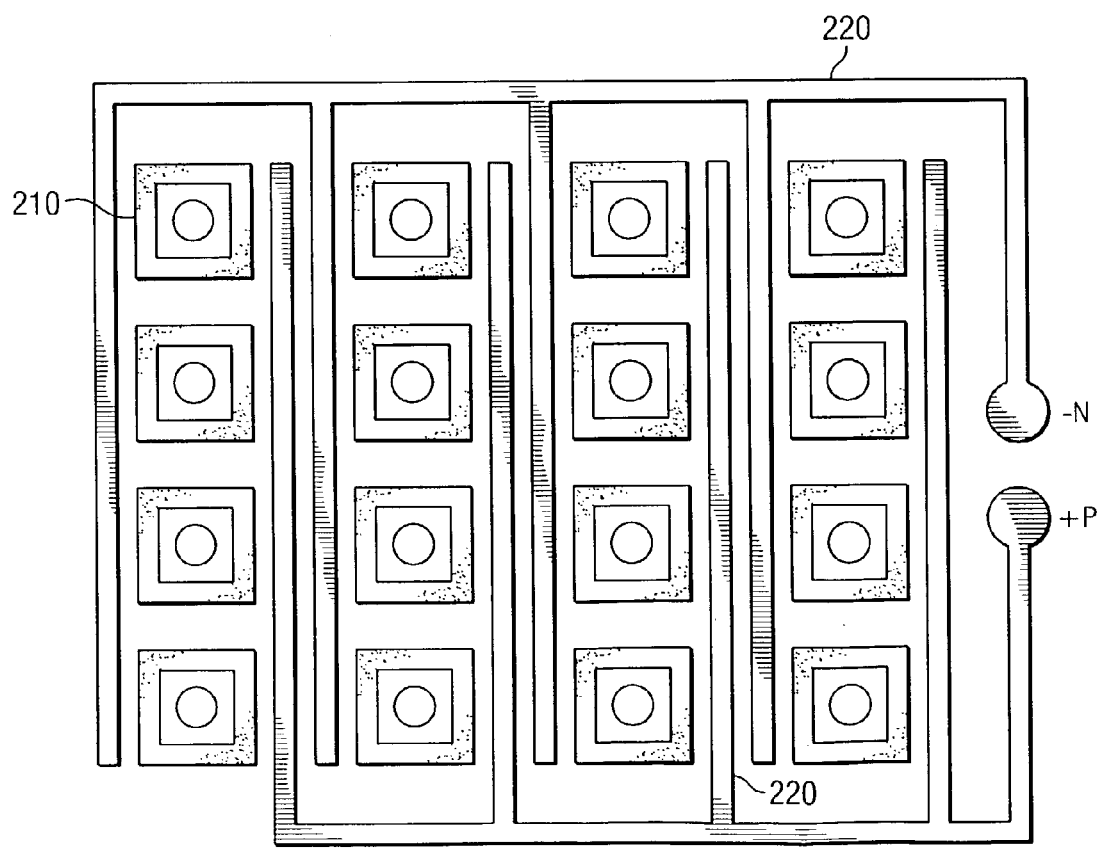
FIG. 2 illustrates a top view of a substrate populated with an array of laser assemblies in accordance with a preferred embodiment of the present invention.

FIG. 2 illustrates a top view of a substrate populated with an array of laser assemblies in accordance with a preferred embodiment of the present invention. A ceramic substrate has formed thereon an array of laser assemblies, such as laser assembly 210. Bus lines 220 enable powering up of the array to allow vision-assisted placement of the microlens with respect to the laser output field. In FIG. 2, the laser assemblies are shown with the microlenses attached.

Figure 3A:
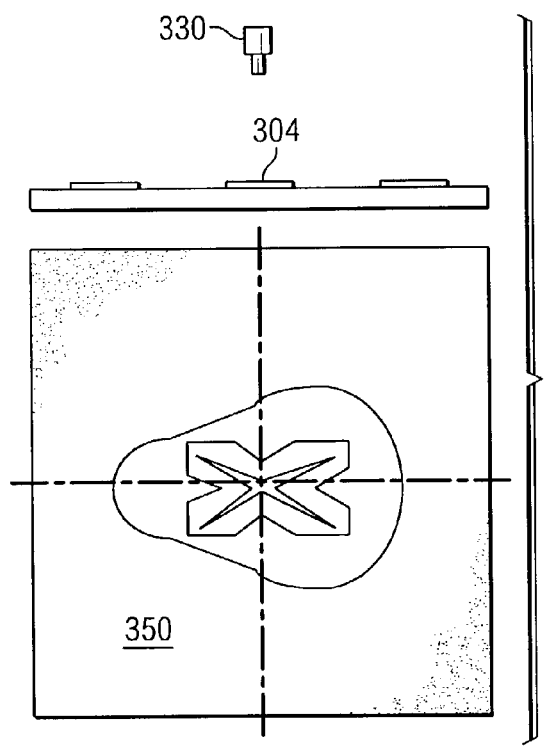
FIGS. 3A–3C are diagrams illustrating active microlens alignment in accordance with a preferred embodiment of the present invention.
Figure 3B:
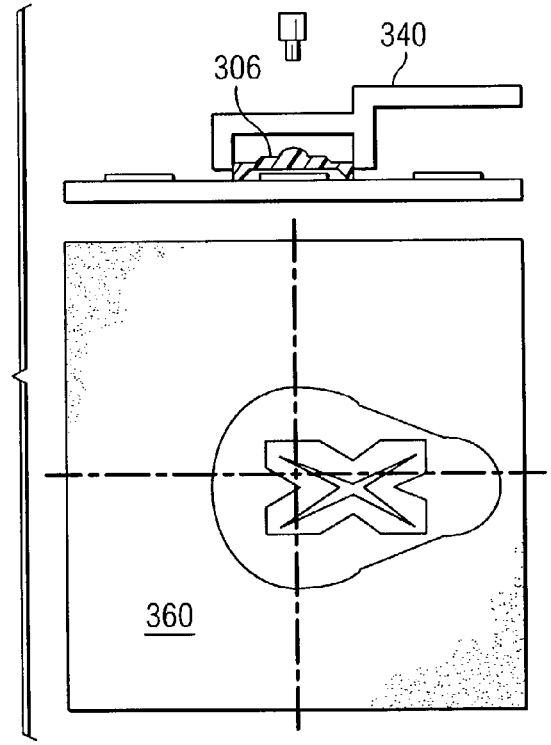
Figure 3C:
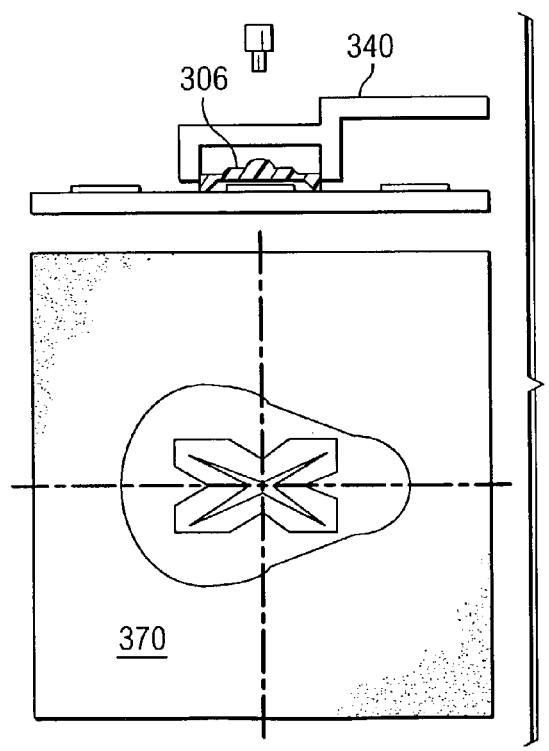

With reference to FIGS. 3A–3C, diagrams illustrating vision-assisted microlens alignment are shown in accordance with a preferred embodiment of the present invention. More particularly, with reference to FIG. 3A, a substrate is shown with laser 304 attached. Stationary camera 330 is positioned to receive light from laser 304 and is mounted orthogonal to the laser die. Camera view 350 illustrates the light received from laser 304. The substrate is positioned to center the camera view on the maximum intensity spot of the laser output field. Since the camera 330 is orthogonal to laser 304, the camera axis is now coincident with the laser optical axis.

Turning now to FIG. 3B, microlens 306 is placed over the laser using pick-and-place tool 340. Camera view 360 illustrates the light received from the laser. As shown in FIG. 3B, microlens 306 laterally inverts the light received from the laser. The microlens also displaces the light unless the optical axis of the lens is precisely aligned with the optical axis of the laser.

Next, with reference to FIG. 3C, the microlens is moved with the pick-and-place tool so that the laser output field is again centered in the camera view. Camera view 370 illustrates the light received from the laser through the microlens with the optical axes aligned. In this state, the microlens is then attached to the substrate. Solder is reflowed to complete the attach.

Figure 4A:
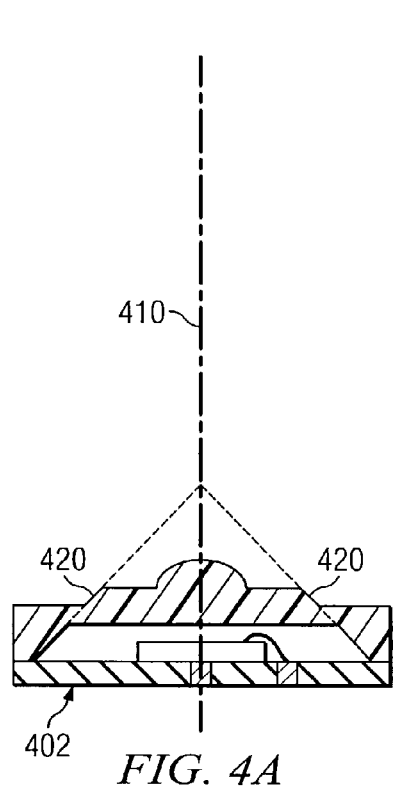
FIG. 4A illustrates a laser assembly with a tapered surface in accordance with a preferred embodiment of the present invention.

With reference now to FIG. 4A, a laser assembly with a tapered surface is shown in accordance with a preferred embodiment of the present invention. Laser assembly 402 includes a microlens with tapered surface 420. Preferably, the tapered surface surrounds the lens in a rectangle or circle to form a cone or pyramid shape. The axis of the cone or pyramid shape aligns with the optical axis 410 of the lens. The tapered surface may also surround the lens in another shape, such as a pentagon, hexagon, or the like, as long as the tapered surface may be mated with a wave guide receptacle to align the optical axes of the lens and the receptacle.

Figure 4B:
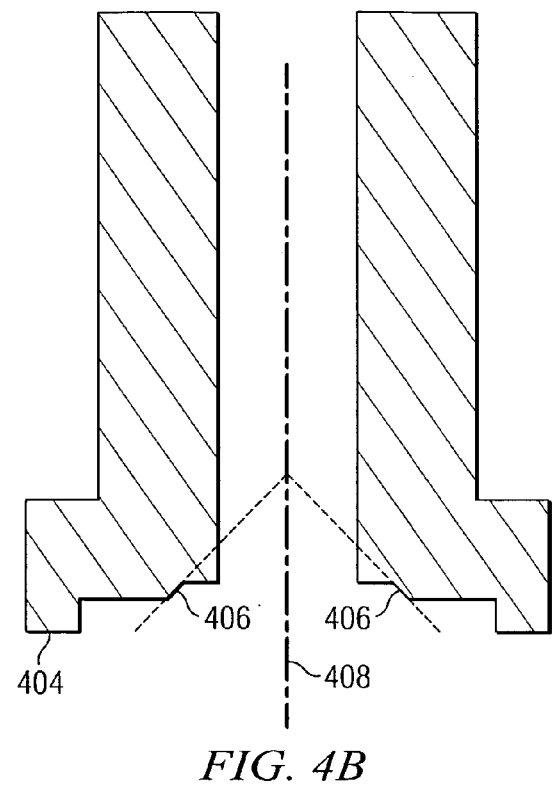
FIG. 4B illustrates a wave guide receptacle with a tapered surface in accordance with a preferred embodiment of the present invention.

Turning to FIG. 4B, a wave guide receptacle with a tapered surface is shown in accordance with a preferred embodiment of the present invention. Wave guide receptacle 404 has formed therein a tapered surface 406 along the molded receptacle bottom. Preferably, the tapered surface surrounds the wave guide cavity in a square or circle to form a cone or pyramid shape. The receptacle may be formed using precision plastic molding technology. The angle of the tapered surface causes an accurate cone or pyramid shape. The axis of the cone or pyramid shape aligns with the optical axis 408 of the wave guide receptacle. The tapered surface may also surround the wave guide cavity in another shape, such as a pentagon, hexagon, or the like, as long as the tapered surface may be mated with the microlens to align the optical axes of the lens and the receptacle. The wave guide receptacle includes a wave guide cavity in which a connection ferule may be inserted. The connection ferule holds a wave or light guide for the laser. In a preferred embodiment of the present invention, the light guide is a single mode fiber.

Figure 5A:
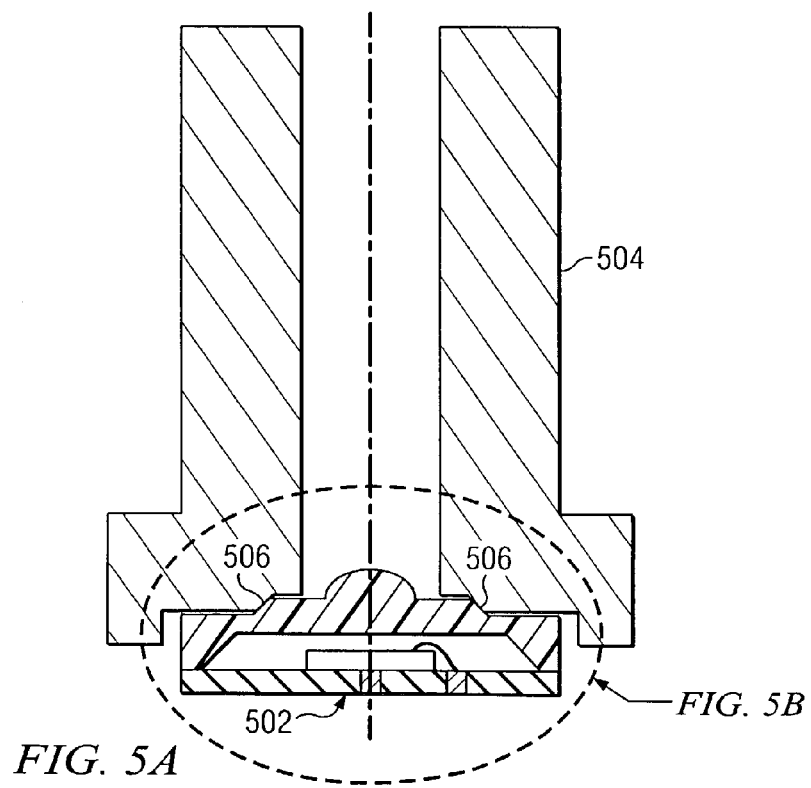
FIGS. 5A and 5B illustrate a laser assembly with a microlens passively aligning with a wave guide receptacle in accordance with a preferred embodiment of the present invention.
Figure 5B:
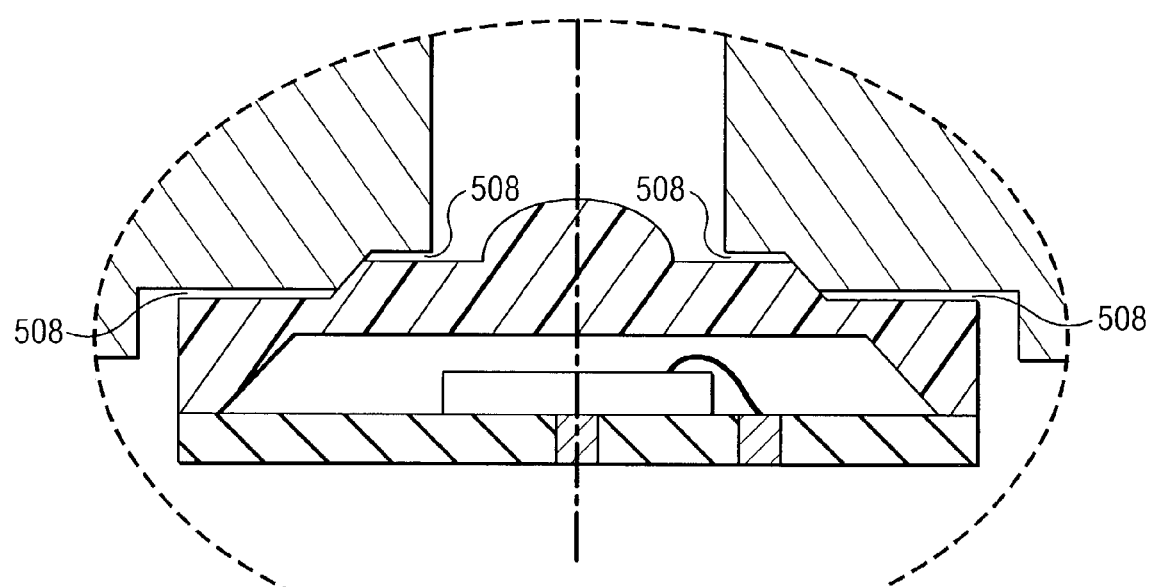

FIGS. 5A and 5B illustrate a laser assembly with a microlens passively aligning with a wave guide receptacle in accordance with a preferred embodiment of the present invention. With passive alignment, there is no need for the laser to be powered on. Instead, the components are naturally self-aligned based upon their shapes, contours, or other physical attributes. While passive alignment of a microlens with a wave guide receptacle is described herein, the passive alignment packaging technique of the present invention need not be used to the exclusion of other alignment techniques. For example, in an alternative embodiment, the passive alignment of the present invention may be reinforced with active alignment techniques, such as that shown in FIGS. 3A–3C.

More particularly, with reference to FIG. 5A, laser assembly 502 is placed in molded receptacle 504. The optical axes of the microlens and the receptacle are automatically, passively aligned because of the tapered surfaces. Preferably, the optical design of the laser, lens, and wave guide are insensitive to the vertical location of the laser assembly in the receptacle.

As seen in the zoomed-in view in FIG. 5B, the microlens and receptacle are mated to passively align the optical axes of the lens and the receptacle. Clearance is provided, shown at 508, between the other surfaces of the microlens and the molded receptacle. Since the optical design is insensitive to the vertical direction but very sensitive to the other two directions, it is important that the positioning of the receptacle relative to the microlens is determined by the precisely molded tapered surfaces. Therefore, the microlens and receptacle come into contact only at the tapered surfaces.

Figure 6A:
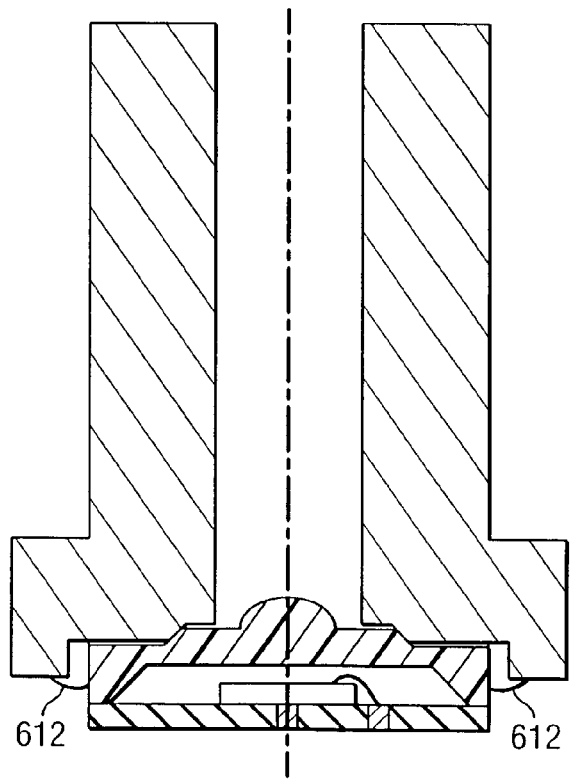
FIGS. 6A–6C depict example transmitter optical sub assemblies in accordance with a preferred embodiment of the present invention.
Figure 6B:
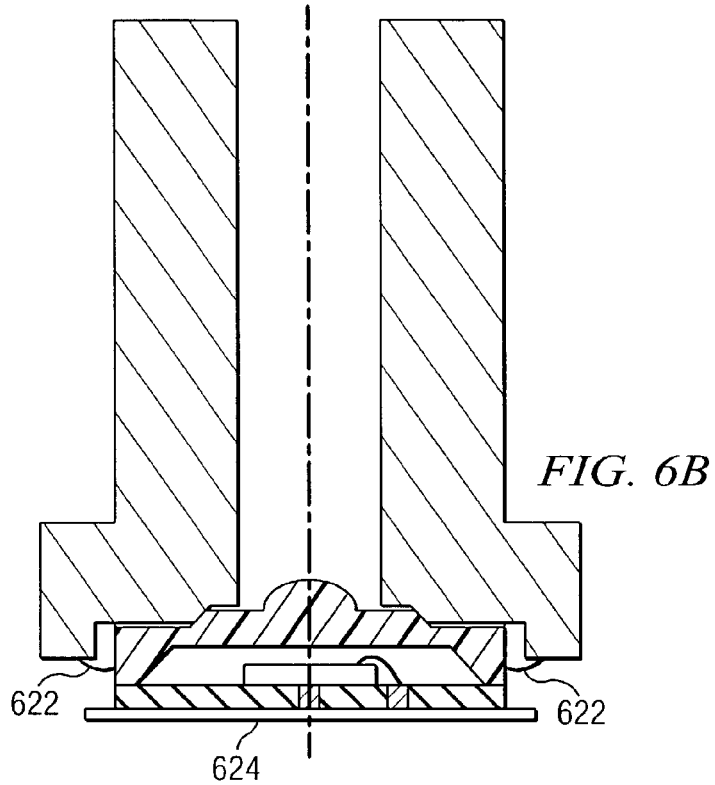
Figure 6C:
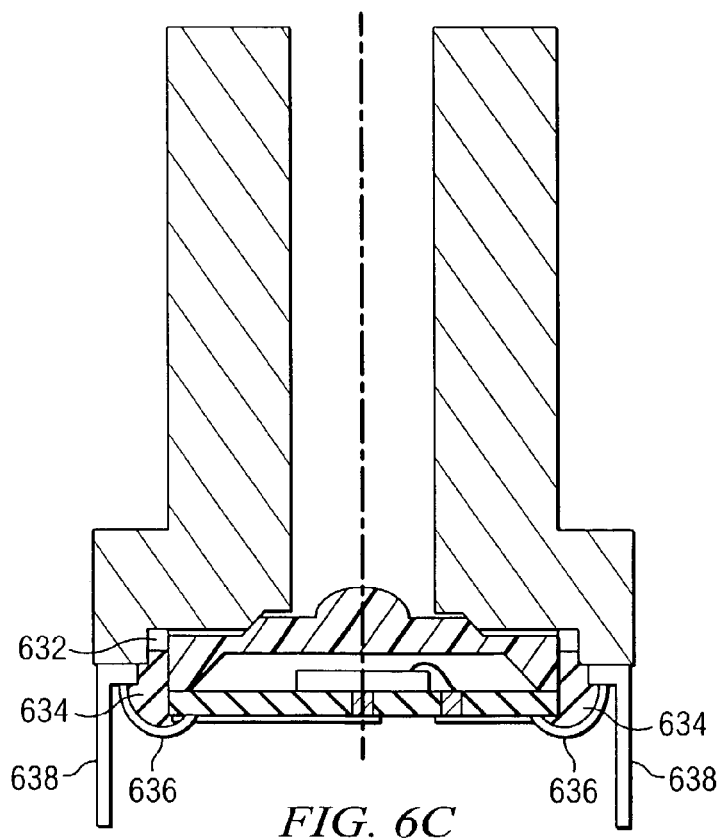

With reference to FIGS. 6A–6C, example transmitter optical sub assemblies (TOSA) are shown in accordance with a preferred embodiment of the present invention. FIG. 6A illustrates a leadless package for high speed modulation.

The laser assembly is affixed to the molded receptacle with epoxy 612. The epoxy is dispensed and cured in-situ or offline. Shrinkage of epoxy forces the tapers to mate with a controlled force. FIG. 6B depicts a laser assembly surface mounted to PCB 624 which has an attached flex tape. Again, the laser assembly is affixed to the molded receptacle with epoxy 622.

Turning to FIG. 6C, an assembly similar to a TO-can package is shown. The laser assembly is affixed to the molded receptacle with epoxy 632 and epoxy 634. Wirebond 636 provides an electrical connection from the laser to leads 638. The leads are molded into the body like a leadframe. More assembly steps are required, including trimming and forming the leads.

Figure 7:
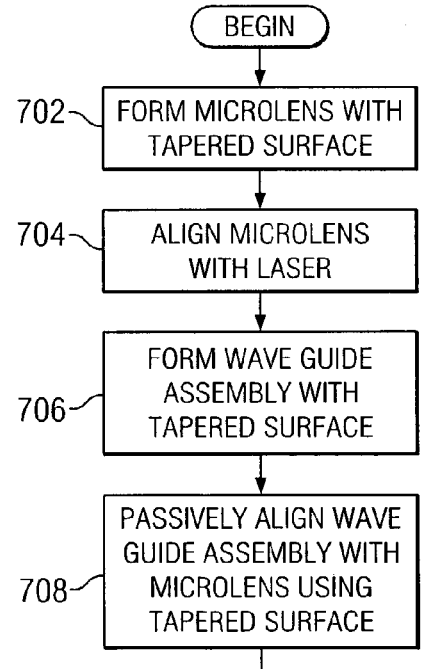
FIG. 7 is a flowchart illustrating the operation of a process for providing a passively aligning microlens and wave guide receptacle assembly in accordance with a preferred embodiment of the present invention.

With reference to FIG. 7, a flowchart is shown illustrating the operation of a process for providing a passively aligning microlens and wave guide receptacle assembly in accordance with a preferred embodiment of the present invention. The process begins and forms a microlens with a tapered surface (step 702). Then, the process aligns the microlens with the laser (step 704). The process forms a wave guide assembly with a tapered surface (step 706). Next, the process passively aligns the wave guide assembly with the microlens using the tapered surfaces (step 708) and ends.

Thus, the present invention solves the disadvantages of the prior art by providing a laser assembly including a microlens and a wave guide receptacle that may be passively aligned. A tapered surface is formed on the microlens. The microlens may be formed from a silicon substrate. The crystalline structure of the silicon causes the tapered surface to be formed accurately along the <111> plane. The angle of the tapered surface causes an accurate cone or pyramid shape. The tapered surface is formed such that the axis of the cone or pyramid is aligned with the optical axis of the lens. The lens may then be aligned with the optical axis of the laser. A light guide receptacle is formed with a tapered surface that matches the tapered surface of the microlens. The tapered surface of the receptacle is formed such that the axis of the cone or pyramid is aligned with the optical axis of the receptacle. The receptacle may then be passively aligned with the microlens by mating the tapered surfaces.

What is claimed is:

1. A method for passively aligning a laser assembly with a wave guide receptacle, the method comprising:
    forming a microlens with a first tapered surface surrounding a lens element;
    aligning the lens element of the microlens with a laser, wherein the laser is affixed to a substrate;
    affixing the microlens to the substrate to form a laser subassembly;
    forming a wave guide receptacle with a second tapered surface surrounding a wave guide cavity; and
    passively aligning the microlens with the wave guide receptacle using the first tapered surface and the second tapered surface.

2. The method of claim 1, wherein the first tapered surface surrounds the lens element in a cone or pyramid shape.

3. The method of claim 2, wherein the axis of the cone or pyramid shape is coincident with the optical axis of the laser.

4. The method of claim 1, wherein the second tapered surface surrounds the wave guide cavity in a cone or pyramid shape.

5. The method of claim 4, wherein the axis of the cone or pyramid shape is coincident with the optical axis of the wave guide cavity.

6. The method of claim 1, wherein the step of passively aligning the microlens with the wave guide receptacle includes aligning the microlens with the wave guide receptacle such that only the first tapered surface and the second tapered surface touch.

7. The method of claim 1, wherein the first tapered surface and the second tapered surface are formed using the same photolithographic mask.

8. The method of claim 1, further comprising:
    affixing the wave guide receptacle to the laser subassembly to form a laser assembly.

9. The method of claim 8, further comprising:
    mounting the laser subassembly to a printed circuit board.

10. The method of claim 8, further comprising:
    attaching leads to the laser assembly; and
    electronically connecting the leads to the laser subassembly with wirebond.

11. A passively aligned laser assembly with a wave guide receptacle, the laser assembly comprising:
    a subassembly including:
        a microlens, wherein the microlens has formed therein a first tapered surface surrounding a lens element;
        a substrate having affixed thereto a laser, wherein the microlens is affixed to the substrate such that the lens element of the microlens is aligned with a laser;
    a wave guide receptacle, wherein the wave guide receptacle has formed therein a second tapered surface surrounding a wave guide cavity,
    wherein the microlens is passively aligned with the wave guide receptacle using the first tapered surface and the second tapered surface.

12. The laser assembly of claim 11, wherein the first tapered surface surrounds the lens element in a cone or pyramid shape.

13. The laser assembly of claim 12, wherein the axis of the cone or pyramid shape is coincident with the optical axis of the laser.

14. The laser assembly of claim 11, wherein the second tapered surface surrounds the wave guide cavity in a cone or pyramid shape.

15. The laser assembly of claim 14, wherein the axis of the cone or pyramid shape is coincident with the optical axis of the wave guide cavity.

16. The laser assembly of claim 11, wherein the microlens is passively aligned with the wave guide receptacle such that only the first tapered surface and the second tapered surface touch.

17. The laser assembly of claim 11, wherein the first tapered surface and the second tapered surface are fanned using the same photolithographic mask.

18. The laser assembly of claim 11, wherein the wave guide receptacle is affixed to the laser subassembly with an epoxy.

19. The laser assembly of claim 18, further comprising:
    a printed circuit board, wherein the printed circuit board is mourned to the subassembly.

20. The laser assembly of claim 18, further comprising:
    leads attached to the laser assembly; and
    wirebond, wherein the wirebond electronically connects the leads to the laser subassembly.

* * * * *

UNITED STATES PATENT AND TRADEMARK OFFICE
CERTIFICATE OF CORRECTION

PATENT NO. : 6,999,494 B2
APPLICATION NO. : 10/464121
DATED : February 14, 2006
INVENTOR(S) : Bhandarkar It is certified that error appears in the above-identified patent and that said Letters Patent is hereby corrected as shown below:

Col. 6, line 49: after "are" delete "fanned" and insert --formed--.

Col. 6, line 6: after "is" delete "mourned" and insert --mounted--.

Signed and Sealed this

Fourth Day of July, 2006

JON W. DUDAS
*Director of the United States Patent and Trademark Office*